(12) United States Patent
Nishida

(10) Patent No.: US 6,898,424 B2
(45) Date of Patent: May 24, 2005

(54) REMOTE CONTROL METHOD AND SYSTEM, SERVER, DATA PROCESSING DEVICE, AND STORAGE MEDIUM

(75) Inventor: Hisayoshi Nishida, Tokyo (JP)

(73) Assignee: NEC Corporation, Tokyo (JP)

( * ) Notice: Subject to any disclaimer, the term of this patent is extended or adjusted under 35 U.S.C. 154(b) by 504 days.

(21) Appl. No.: 09/851,967

(22) Filed: May 10, 2001

(65) Prior Publication Data

US 2001/0041563 A1 Nov. 15, 2001

(30) Foreign Application Priority Data

May 11, 2000 (JP) .................................. P2000-139000

(51) Int. Cl.⁷ .............................................. H04M 3/00
(52) U.S. Cl. .................... 455/420; 455/415; 455/426.1; 455/411; 379/220.01; 709/219
(58) Field of Search ................. 709/219, 217, 709/239, 222; 455/415, 418–420, 426.1, 445, 265.13, 414.3, 456.3, 410–411; 379/219, 220.01; 380/247

(56) References Cited

U.S. PATENT DOCUMENTS

| | | | | |
|---|---|---|---|---|
| 4,866,732 A | * | 9/1989 | Carey et al. ................. | 375/141 |
| 5,909,183 A | * | 6/1999 | Borgstahl et al. ....... | 340/825.22 |
| 6,137,805 A | * | 10/2000 | Berstis ........................ | 370/428 |
| 6,185,194 B1 | * | 2/2001 | Musk et al. ................. | 370/260 |
| 6,308,204 B1 | * | 10/2001 | Nathan et al. ............... | 709/221 |
| 6,327,355 B1 | * | 12/2001 | Britt ....................... | 379/201.03 |
| 6,480,586 B1 | * | 11/2002 | Hayes et al. ........... | 379/102.02 |
| 6,510,212 B2 | * | 1/2003 | Ito et al. ................. | 379/102.03 |
| 6,671,510 B1 | * | 12/2003 | Kelly et al. ................. | 455/445 |
| 6,681,110 B1 | * | 1/2004 | Crookham et al. ......... | 455/420 |
| 2001/0019953 A1 | * | 9/2001 | Furukawa et al. .......... | 455/420 |
| 2001/0030597 A1 | * | 10/2001 | Inoue et al. ................ | 340/3.7 |
| 2001/0039195 A1 | * | 11/2001 | Nickum ...................... | 455/557 |
| 2003/0008650 A1 | * | 1/2003 | Matsuyama et al. ........ | 455/426 |
| 2003/0013485 A1 | * | 1/2003 | Jung .......................... | 455/557 |
| 2003/0073432 A1 | * | 4/2003 | Meade ........................ | 455/420 |

* cited by examiner

*Primary Examiner*—Sonny Trinh
*Assistant Examiner*—Marcos L. Torres
(74) *Attorney, Agent, or Firm*—Whitham, Curtis & Christofferson P.C.

(57) ABSTRACT

A remote control system for operating a data processing device from a remote place by using a portable device while the user is out or the like is disclosed. In the system, the portable device associated with the data processing device sends control data for operating the data processing device to a server via the Internet, and calls the data processing device via a telephone network. The data processing device refers to a caller's number communicated when the current call is accepted, and recognizes, based on the caller's number, whether the call is issued from the portable device associated with the data processing device. The data processing device downloads the control data from the server if the call is issued from the portable device, and executes a process indicated by the downloaded control data.

6 Claims, 3 Drawing Sheets

| No. | PROCESS | DATA |
|---|---|---|
| 1 | TV RECORDING | April 3rd, 21:30 to 22:24, 1CH |
| 2 | INTERNET BROWSING | March 31th, 3:00, http://www.xxx.xxx.xxx |
| ... | ... | |
| | ... | |
| E | END | |

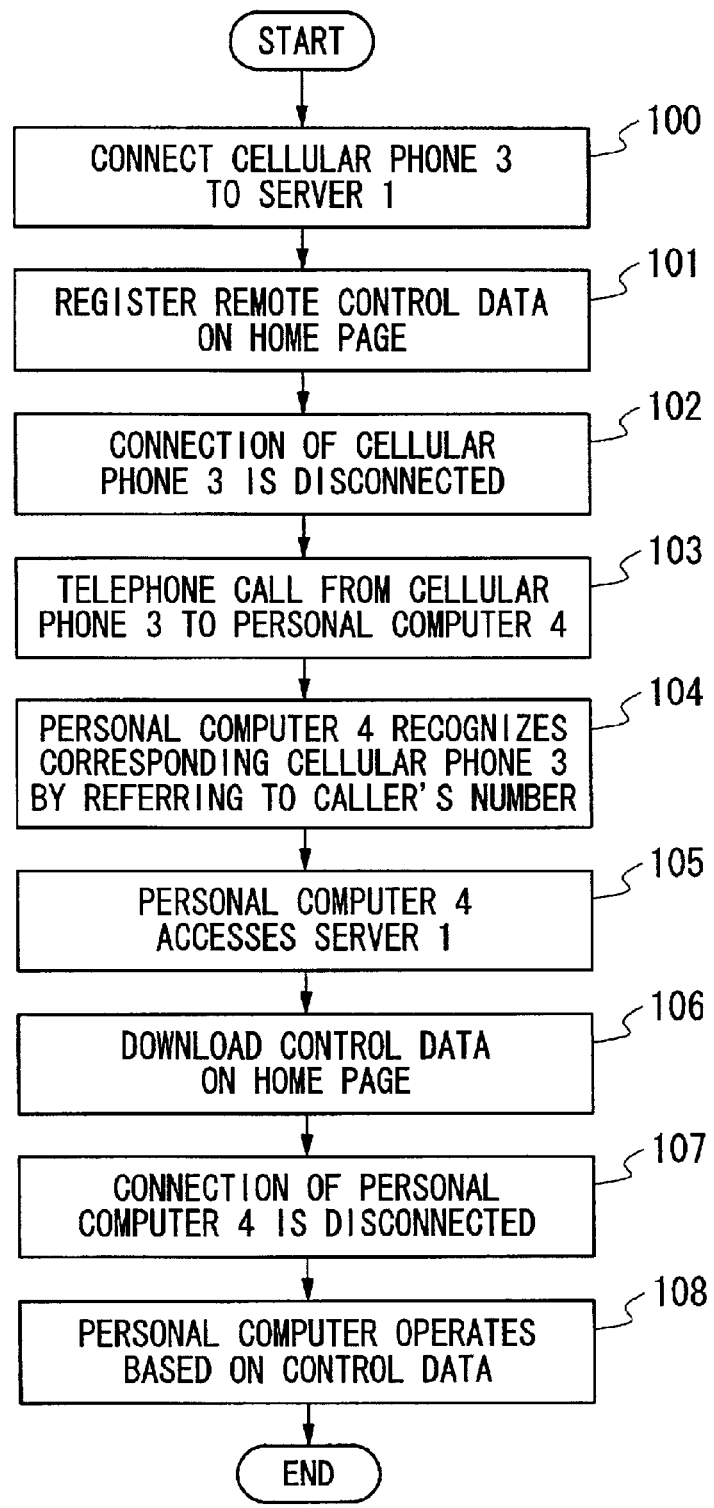

REMOTE CONTROL METHOD AND SYSTEM, SERVER, DATA PROCESSING DEVICE, AND STORAGE MEDIUM

BACKGROUND OF THE INVENTION

1. Field of the Invention

The present invention relates to a remote control system for remote-controlling a data processing device such as a personal computer, and in particular, one for remote-controlling a data processing device via the Internet.

2. Description of the Related Art

Data processing devices such as a personal computer can execute various kinds of processes and are used in various situations.

Generally, in order to make a data processing device execute a process, the user must operate the data processing device or store, in advance, a target process (to be executed) in the data processing device. Here, the user should be near the data processing device so as to operate the data processing device or to store a target process in the data processing device.

On the other hand, a dedicated program may be installed in both a data processing device at the controlling side and a data processing device at the controlled side, so as to remote-control the data processing device at the controlled side. More specifically, the user logs in to the data processing device at the controlled side by using the data processing device at the controlling side via a communication line (i.e., in a remote form), and activates a program or the like stored in the data processing device at the controlled side. Therefore, the data processing device at the controlled side operates as if it is being directly operated by the user. In this case, the data processing device at the controlling side must have an operating system similar to that in the data processing device at the controlled side, and must have input devices similar to those necessary for directly operating the data processing device at the controlled side, such as a keyboard and a mouse. According to this method, the user can log in to a data processing device in the user's office by using a data processing device in the user's home via remote operation and perform the user's job.

If the data processing devices can be remote-controlled, they have various convenient uses. If it is assumed that home electric appliances such as video tape recorders and audio devices are controlled using a data processing device, it is unpreferable for a user in a remote place to carry a portable data processing device (at the controlling side) which has a keyboard and the like and is operated using an operating system similar to that built into a data processing device in the user's home. Therefore, conventional remote control methods are not suitable for remote-controlling the data processing device of the user's home from a remote place where the user is staying.

SUMMARY OF THE INVENTION

In consideration of the above circumstances, an objective of the present invention is to provide a remote control system for operating a data processing device from a remote place by using a portable device while the user is out or the like.

Therefore, the present invention provides a remote control method of remote-controlling a data processing device, comprising:

a step, performed by a portable device associated with the data processing device, of sending control data for operating the data processing device to a server via the Internet;

a step, performed by the portable device, of calling the data processing device via a telephone network;

a step, performed by the data processing device, of referring to a caller's number communicated when the current call is accepted, and recognizing, based on the caller's number, whether the call is issued from the portable device associated with the data processing device;

a step, performed by the data processing device, of downloading the control data from the server if the call is issued from the portable device; and a step, performed by the data processing device, of executing a process indicated by the downloaded control data.

Therefore, the operation of the data processing device can be remote-controlled via the server by using the portable device. In addition, the correspondence between the portable device and the data processing device can be confirmed using the caller's number communicated when the relevant call is accepted; therefore, a portable device which does not correspond to the relevant data processing device does not designate the downloading operation.

The present invention also provides a remote control system for remote-controlling a data processing device via the Internet, comprising:

a server having a storage device, for receiving, via the Internet, control data by which the data processing device operates and storing the received control data in the storage device, and for sending the stored control data to the data processing device via the Internet according to a request;

a portable device associated with the data processing device, for registering the control data via the Internet to the server, and then calling the data processing device via a telephone network and designating the data processing device to download the control data from the server; and the data processing device for:

recognizing whether the current call is issued from the portable device associated with the data processing device by referring to a caller's number communicated when the call is accepted;

sending the server, via the Internet, a request for downloading the control data from the server according to the designation of the portable device if it is recognized that the call issued from the relevant portable device;

receiving the control data downloaded from the server; and operating based on the received control data.

Typically, the portable device is a cellular phone.

The present invention also provides a server for making a portable device remote-control a data processing device via the Internet, comprising:

a memory for storing a program and data for remote-controlling the data processing device; and a processor for receiving, via the Internet, control data by which the data processing device operates from the portable device and storing the received data in a storage device, and for sending the control data to the data processing device via the Internet according to a request from the data processing device.

The present invention also provides a data processing device remote-controlled by a portable device, comprising:

a memory for storing a program and data for being remote-controlled by the portable device; and a processor for:

recognizing whether a received call is issued from the portable device associated with the data processing device by referring to a caller's number communicated when the call is accepted;

sending a server, via the Internet, a request for downloading the control data from the server according to a designation of the portable device if it is recognized that the call is issued from the relevant portable device;

receiving the control data downloaded from the server; and executing a process based on the received control data.

The present invention also provides a computer readable storage medium storing a program for operating a server provided for controlling a data processing device from a portable device via the Internet, the program including:

a step of receiving, via the Internet, control data by which the data processing device operates from the portable device;

a step of storing the received control data in a storage device; and a step for sending the control data to the data processing device via the Internet according to a request from the data processing device.

The present invention also provides another computer readable storage medium storing a program for operating a data processing device remote-controlled by a portable device, the program including:

a step of recognizing whether a received call is issued from the portable device associated with the data processing device by referring to a caller's number communicated when the call is accepted;

a step of sending a server, via the Internet, a request for downloading control data from the server according to a designation of the portable device if it is recognized that the call is issued from the relevant portable device;

a step of receiving the control data downloaded from the server; and a step of executing a process based on the received control data.

According to the present invention, the operation of the data processing device can be remote-controlled by using the portable device. Therefore, a user who is out can make the data processing device of the user's home execute a desired process, or control a home electric appliance connected to the data processing device. In addition, the correspondence between the portable device and the data processing device can be confirmed using the caller's number communicated when the relevant call is accepted; therefore, a portable device which does not correspond to the relevant data processing device does not designate the downloading operation, and the data processing device is not operated by erroneous control.

BRIEF DESCRIPTION OF THE DRAWINGS

FIG. 2 is a flowchart of the operation of the remote control system of the embodiment.

DESCRIPTION OF THE PREFERRED EMBODIMENTS

Hereinafter, an embodiment according to the present invention will be explained in detail with reference to the drawings.

The remote control system of the embodiment provides a remote control service for downloading remote control data (registered in a server by using a cellular phone or the like) into a personal computer of the user's home, and for operating the personal computer based on the remote control data.

Figures 1, 3:
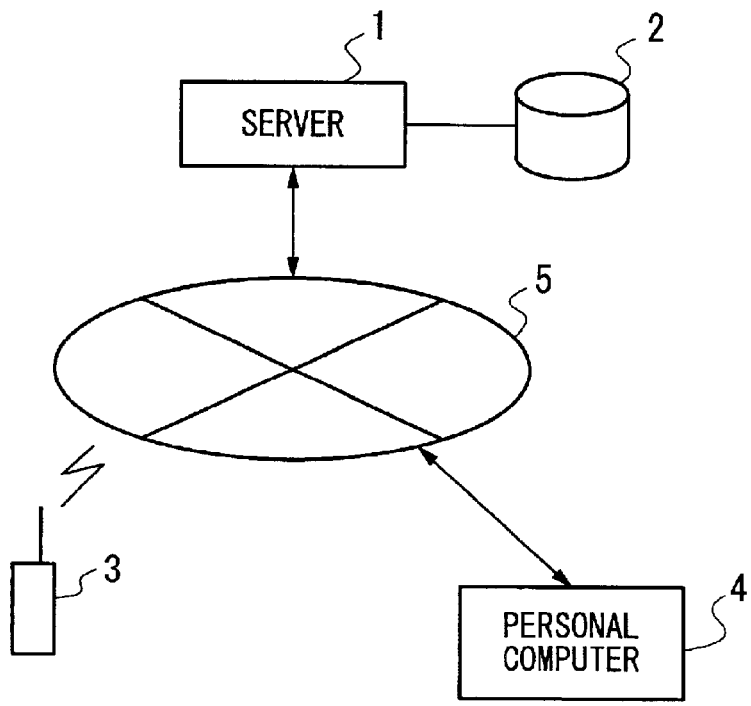
FIG. 1 is a diagram showing the structure of an embodiment of the remote control system according to the present invention.
FIG. 3 is a diagram showing the data structure of the remote control data used in the embodiment.

The remote control system of the present invention shown in FIG. 1 comprises (i) a server 1 and a storage device 2 at the provider side, and (ii) a cellular phone 3 and a personal computer 4 at the user's side. Here, the cellular phone 3 and the personal computer 4 are connected to the server 1 via the Internet 5, so that data transmission (sending and receiving) is possible between these devices.

The server 1 is a data processing device for storing data in the storage device 2, where the data is used for forming a home page which each user can establish. The server also receives remote control data from the cellular phone 3 of each user, and stores the remote control data corresponding to the home page of the relevant user in the storage device 2. In addition, according to a request from the personal computer 4 of each user, the server 1 sends the stored remote control data related to the relevant user to the personal computer 4 of the user.

The storage device 2 is connected to the server 1, and stores (i) data for forming home pages of each user, and (ii) remote control data for each home page, which is registered on each user's home page by using the cellular phone 3.

The cellular phone 3 has a function of accessing the server 1 of the provider via a communication network (i.e., Internet 5). The user can register the remote control data in the user's own home page by operating the cellular phone 3. Also, due to the user's operation, the cellular phone calls to the user's personal computer 1 and commands (or designates) the personal computer to download the remote control data. Here, the calling operation itself may be used as a designation for downloading the remote control data, or data for the designation may be sent after the telephone connection is established.

The called personal computer 4 recognizes that the current call is issued from the user's own cellular phone 3, by referring to a caller's number (or ID) which is communicated when the call is accepted. Then, in response to the designation of the user's cellular phone 3, the personal computer 4 sends to the server 1 a request for downloading the remote control data registered on the user's own home page. Additionally, after the personal computer 4 receives the remote control data, downloaded via the Internet 5 from the server 1, the personal computer 1 operates based on the received remote control data.

As explained above, the cellular phone 3 and the personal computer 4 are connected to the server 1 via the Internet 5. Accordingly, document, image, voice data, or the like can be transmitted between these devices.

The operation of the remote control system of the present embodiment will be explained below.

With reference to FIG. 2, in the first step 100, the cellular phone 3 operated by the user is connected to the server 1 via the Internet 5. In the next step 101, remote control data for controlling the personal computer 4 is registered on the user's own home page. Accordingly, the remote control data corresponding to the user's own home page is stored in the storage device 2. In the following step 102, the connection between the cellular phone 3 and the server 1 via the Internet 5 is disconnected.

Then in step 103, the cellular phone 3 calls the personal computer 4 via a telephone line. In the next step 104, the personal computer 4 recognizes (i.e., determines) whether the current call is from the user's own cellular phone 3. If it is determined that the current call is from the user's own cellular phone 3, the personal computer 4 recognizes the current call as a designation for downloading the remote control data.

In the next step 105, the personal computer 4 accesses the server 1 via the Internet 5. In step 106, according to a request sent from the personal computer 4, the remote control data registered on the user's home page is downloaded from the server 1 to the personal computer 4. In the next step 107, the connection between the personal computer 4 and the server 1 via the Internet 5 is disconnected.

In step 108, the personal computer 4 is operated based on the remote control data. With reference to FIG. 3, the remote control data consists of, for example, at least one process, and control data corresponding to the process. According to the contents of the remote control data, the personal computer 4 performs, for example, a process of TV recording, Internet browsing, or the like.

Therefore, the personal computer 4 can be remote-operated via the server 1 by using the cellular phone 3. Accordingly, a user who is out can make the personal computer 4 of the user's home execute a desired process, or control a home electric appliance connected to the personal computer 4. In addition, the caller's number communicated when the call is accepted is used for confirming the user's own cellular phone 3; thus, a cellular phone 3 which does not correspond to the relevant personal computer 4 does not designate the downloading operation, and the personal computer is not operated by erroneous control.

Figure 4:
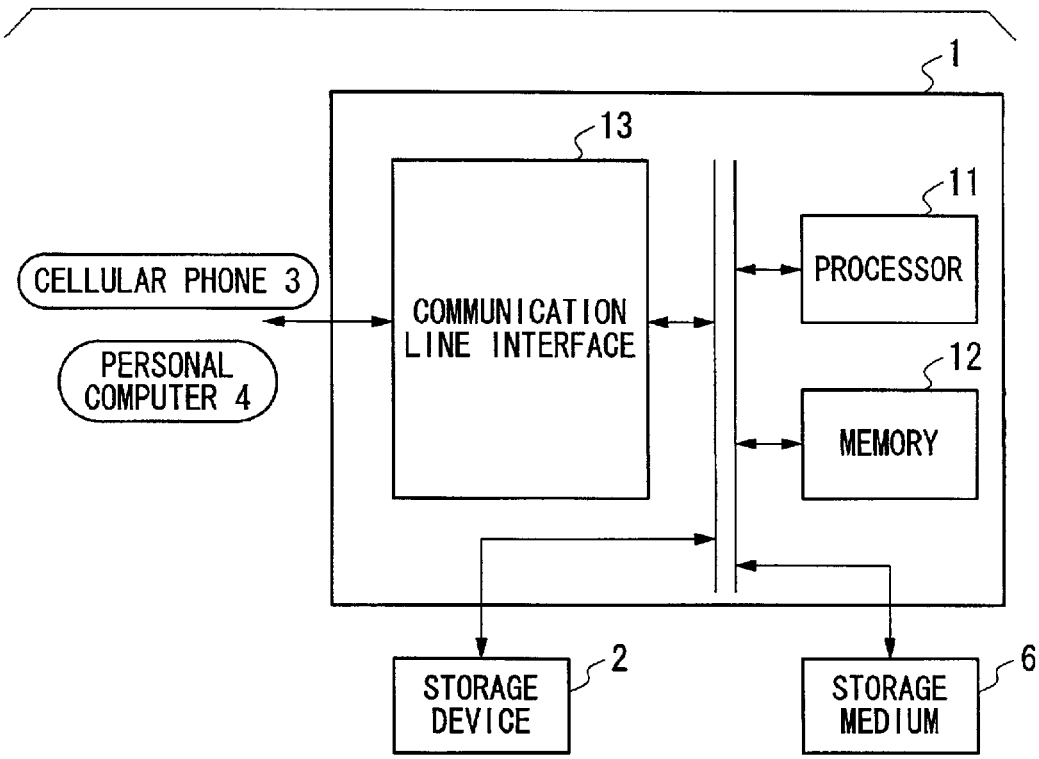
FIG. 4 is a diagram showing the structure of the server in the embodiment.

With reference to FIG. 4, the server 1 in the present embodiment is a data processing device having a processor 11, a memory 12, and a communication line interface 13. The server 1 is thus connected to the cellular phone 3 and the personal computer 4 via the communication line interface 13 and the Internet 5. The storage medium 6 is a floppy disk, CD-ROM, magneto optical disk, or the like, in which a program for operating the server 1 as the server in the present remote control system is stored.

The processor 11 retrieves the program from the storage medium 6 and stores the retrieved program in the memory 12, and then executes the program.

Figure 5:
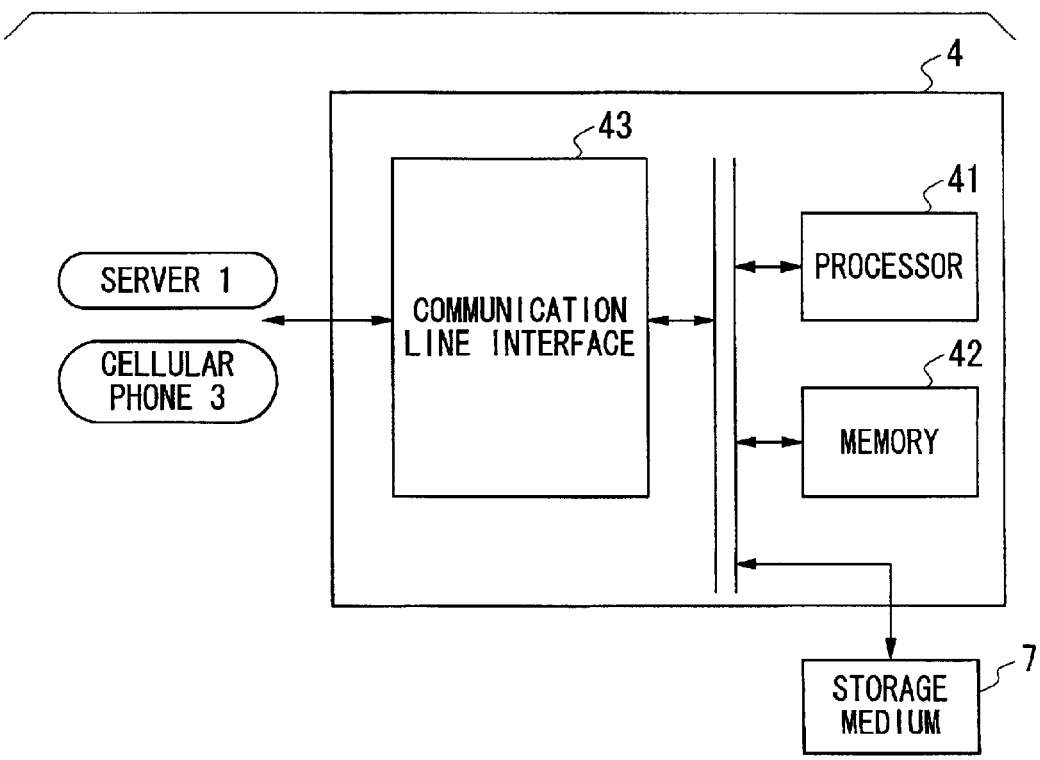
FIG. 5 is a diagram showing the structure of the personal computer in the embodiment.

With reference to FIG. 5, the personal computer 4 in the present embodiment is a data processing device having a processor 41, a memory 42, and a communication line interface 43. The personal computer 4 is connected to the server 1 via the communication line interface 43 and the Internet 5, and is connected to the cellular phone 3 via the communication line interface 43 and a telephone network. The storage medium 7 is a floppy disk, CD-ROM, magneto optical disk, or the like, in which a program for operating the personal computer 4 as the personal computer in the present remote control system is stored.

The processor 41 retrieves the program from the storage medium 7 and stores the retrieved program in the memory 42, and then executes the program.

What is claimed is:

1. A remote control method of remote-controlling a data processing device, comprising the steps of:

a step, performed by a server connected to the Internet, of storing control data by which the data processing device operates;

a step, performed by a portable device associated with the data processing device, of registering control data for operating the data processing device with the server via the Internet;

a step, performed by the portable device, of calling the data processing device via a telephone network;

a step, performed by the data processing device, of referring to a caller's number communicated when the current call is accepted, and recognizing, based on the caller's number, whether the call is issued from the portable device associated with the data processing device;

a step, performed by the data processing device, of downloading the control data from the server if the call is issued from the portable device; and a step, performed by the data processing device, of executing a process indicated by the downloaded control data.

2. A remote control method as claimed in claim 1, wherein the portable device is a cellular phone.

3. A remote control system for remote-controlling a data processing device via the Internet, comprising:

a server having a storage device, for receiving, via the Internet, control data by which the data processing device operates and storing the received control data in the storage device, and for sending the stored control data to the data processing device via the Internet according to a request;

a portable device associated with the data processing device, for registering the control data via the Internet with the server, and then calling the data processing device via telephone network and requesting the data processing device to download the control data from the server; and the data processing device:
   recognizing whether the current call is issued from the portable device associated with the data processing device by referring to a caller's number communicated when the call is accepted;
   sending the server, via the Internet a request for downloading the control data from the server according to the designation of the portable device if it is recognized that the call is issued from the relevant portable device; and
   receiving the control data downloaded from the server, and operating based on the received control data.

4. A remote control system as claimed in claim 3, wherein the portable device cellular phone.

5. A remote control method as claimed in claim 1, wherein the process executed by the data processing device includes controlling home electric appliances.

6. A remote control system as claimed in claim 3, wherein the data processing device operates based on the received control data to control home electric appliances.

* * * * *